United States Patent
Han

(10) Patent No.: US 10,259,367 B2
(45) Date of Patent: Apr. 16, 2019

(54) DOOR ARMREST ASSEMBLY FOR VEHICLE

(71) Applicants: Hyundai Motor Company, Seoul (KR); Kia Motors Corporation, Seoul (KR)

(72) Inventor: Je Sun Han, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/722,476

(22) Filed: Oct. 2, 2017

(65) Prior Publication Data

US 2018/0339614 A1 Nov. 29, 2018

(30) Foreign Application Priority Data

May 29, 2017 (KR) ........................ 10-2017-0066215

(51) Int. Cl.
*B60N 2/75* (2018.01)
*B60R 21/055* (2006.01)
*B60R 21/04* (2006.01)

(52) U.S. Cl.
CPC .............. *B60N 2/787* (2018.02); *B60N 2/78* (2018.02); *B60R 21/0428* (2013.01); *B60R 21/055* (2013.01)

(58) Field of Classification Search
CPC ...... B60N 2/787; B60N 2/78; B60R 21/0428; B60R 21/055

USPC ............... 296/153, 187.05, 146.7, 1.09, 1.08
See application file for complete search history.

(56) References Cited

U.S. PATENT DOCUMENTS

| | | | | |
|---|---|---|---|---|
| 5,749,600 A * | 5/1998 | Yamada | ................. | B60J 5/0425 280/751 |
| 6,364,398 B1 * | 4/2002 | Kim | ....................... | B60J 5/0443 296/146.6 |
| 6,568,743 B1 * | 5/2003 | Jayasuriya | ......... | B60N 2/42727 296/153 |
| 6,688,671 B2 * | 2/2004 | Fukutomi | .............. | B60J 5/0425 296/146.6 |
| 7,341,277 B2 * | 3/2008 | Huttsell | ................. | B60J 5/0425 280/751 |
| 8,083,283 B2 * | 12/2011 | Bailey | ...................... | B60N 2/78 296/153 |
| 2009/0206630 A1 * | 8/2009 | Cavallin | .................. | B60J 5/042 296/146.7 |

FOREIGN PATENT DOCUMENTS

JP 2002046520 A * 2/2002

* cited by examiner

*Primary Examiner* — Jason S Morrow
*Assistant Examiner* — E Turner Hicks
(74) *Attorney, Agent, or Firm* — Morgan, Lewis & Bockius LLP

(57) ABSTRACT

A door armrest assembly for a vehicle, may include a trim panel covering an internal side of a vehicle door and having a pushing member; and a door armrest mounted on the trim panel and having a protrusion disposed adjacent to the pushing member, wherein at least a portion of the door armrest is separable from the trim panel in a side impact as the pushing member of the trim panel pushes the protrusion.

14 Claims, 5 Drawing Sheets

DOOR ARMREST ASSEMBLY FOR VEHICLE

CROSS-REFERENCE(S) TO RELATED APPLICATIONS

The present application claims priority to Korean Patent Application No. 10-2017-0066215, filed on May 29, 2017, the entire contents of which is incorporated herein for all purposes by this reference.

BACKGROUND OF THE INVENTION

Field of the Invention

The present invention relates to a door armrest assembly for a vehicle and, more particularly, to a door armrest assembly having a rigidity sufficient to support an arm of an occupant and preventing injury to the occupant, as at least a portion of the door armrest is separable from a trim panel in the event of a side impact.

Description of Related Art

A door of a vehicle is provided with a door armrest configured for supporting the arm of an occupant.

The door armrest is designed to have a rigidity sufficient to withstand a load applied by the occupant's arm. However, when the rigidity of the door armrest is excessive, the door armrest may strike a flank, abdomen, or the like, of the occupant in the event of a side impact, causing severe injury to the occupant.

Thus, the door armrest may be designed to be collapsible in the event of a side impact, absorbing impact energy and preventing injury to the occupant.

According to the conventional art, the door armrest has at least a groove or at least a through-hole, so the door armrest has been configured to be collapsible due to the groove or the through-hole in the event of a side impact, to absorb the impact energy.

However, the groove or the through-hole of the door armrest, according to the conventional art, may reduce the rigidity for supporting the occupant's arm under normal conditions.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a door armrest assembly for a vehicle configured to provide a rigidity sufficient to support the arm of an occupant under normal conditions, and prevent injury to the occupant as at least a portion of the door armrest is separable from a trim panel in the event of a side impact.

According to various aspects of the present invention, a door armrest assembly for a vehicle may include a trim panel covering an internal side of a vehicle door and having a pushing member; and a door armrest mounted on the trim panel and having a protrusion disposed adjacent to the pushing member, wherein at least a portion of the door armrest is separable from the trim panel in a side impact as the pushing member of the trim panel pushes the protrusion.

The trim panel may include an upper trim panel disposed on an internal upper portion of the vehicle door, and a lower trim panel disposed on an internal lower portion of the vehicle door, and the pushing member may be provided with the upper trim panel.

The door armrest may include a first end portion supported by a lower end portion of the upper trim panel, and a second end portion supported by an upper end portion of the lower trim panel, and the protrusion may be disposed on a portion of the door armrest adjacent to the first end portion.

An extending portion may extend from a lower end portion of the upper trim panel in a vertical direction, and the pushing member may be coupled to the extending portion by a fastener.

The extending portion may be offset in relation to the upper trim panel in an external direction of the vehicle door.

The upper trim panel may include a notch.

The pushing member may have an inclined surface facing the protrusion of the door armrest.

The protrusion may have an inclined surface facing the pushing member.

The door armrest may include an armrest core, a cushion disposed on an upper surface of the armrest core, and a cover configured for covering an upper portion of the cushion.

The vehicle door may include a striking portion configured for striking the pushing member.

The upper trim panel may include a base panel, and a buffer sheet attached to the base panel.

The base panel may face an internal surface of the vehicle.

The base panel may include a material having a higher rigidity than that of the buffer sheet.

The buffer sheet may include a shock-absorbing material.

The base panel may have a thickness less than a thickness of the buffer sheet.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
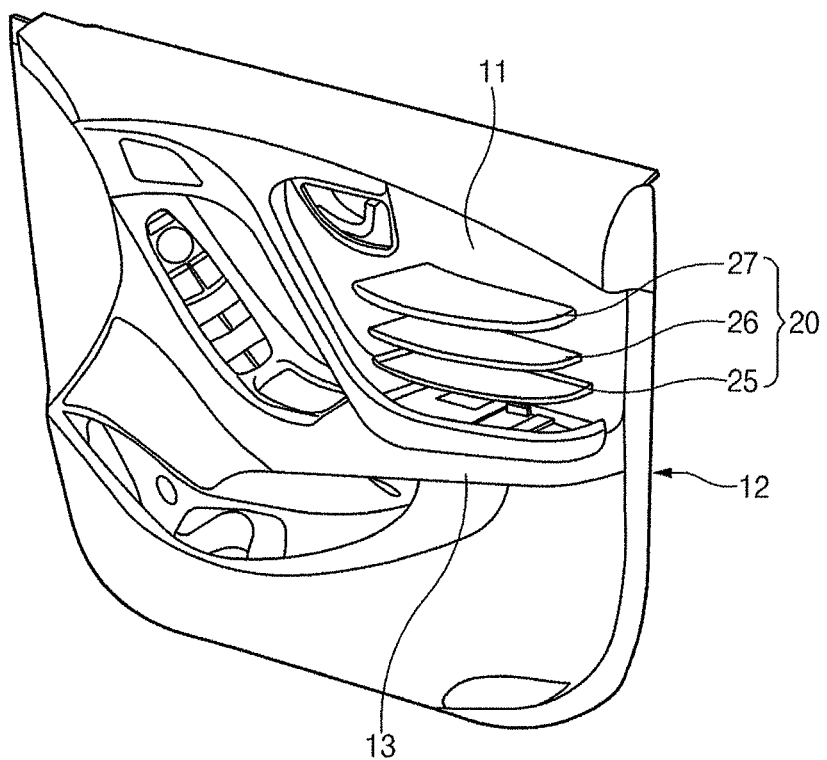
FIG. 1 illustrates an exploded perspective view of a door armrest assembly for a vehicle, which is built into a door trim of a vehicle door, according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Terms including first, second, A, B, (a), and (b) may be used to describe the elements in exemplary embodiments of the present invention. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present invention belongs. Such terms as those defined in a generally used dictionary are configured to be interpreted as having meanings equal to the contextual meanings in the relevant field of art, and are not to be interpreted as having ideal or excessively formal meanings unless clearly defined as having such in the present application.

Figure 2:
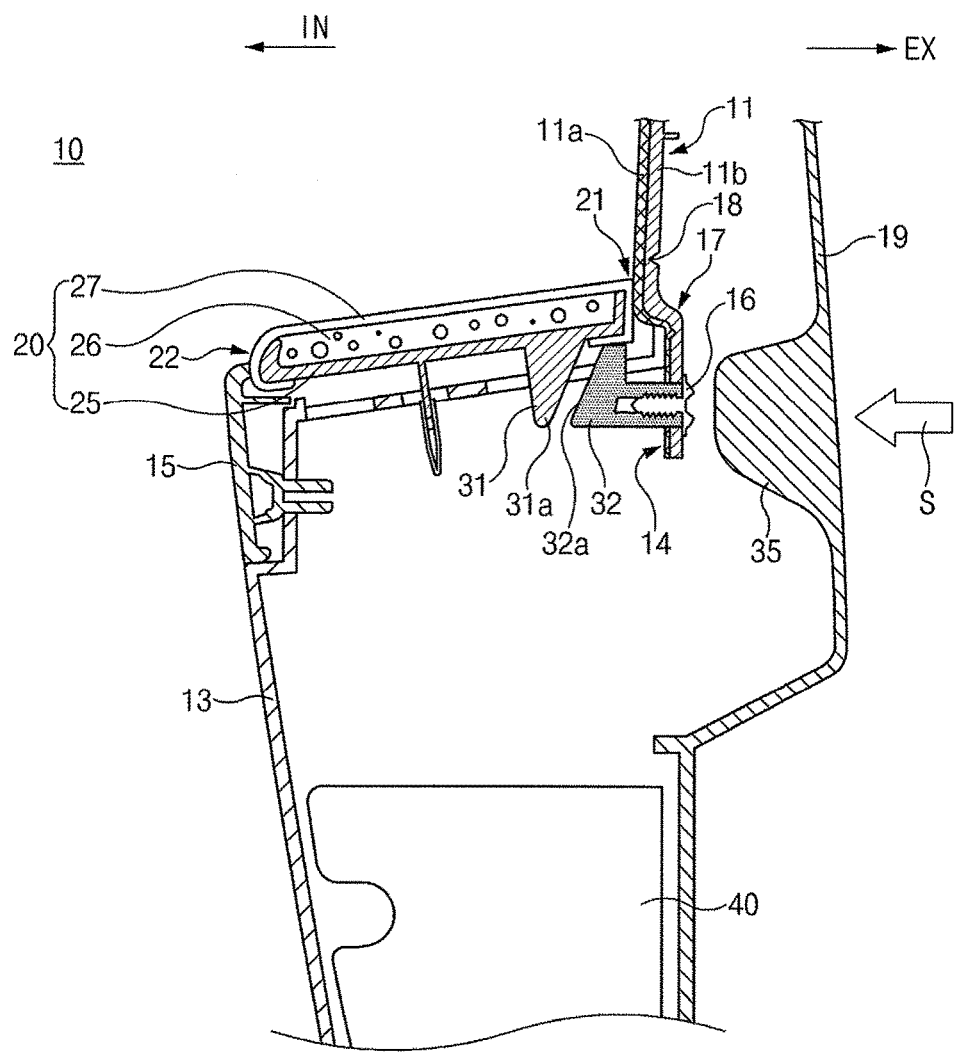
FIG. 2 illustrates a cross-sectional view of a structure in which a door armrest assembly for a vehicle, according to an exemplary embodiment of the present invention, is built into a vehicle door, before the occurrence of a side impact.
Figure 3:
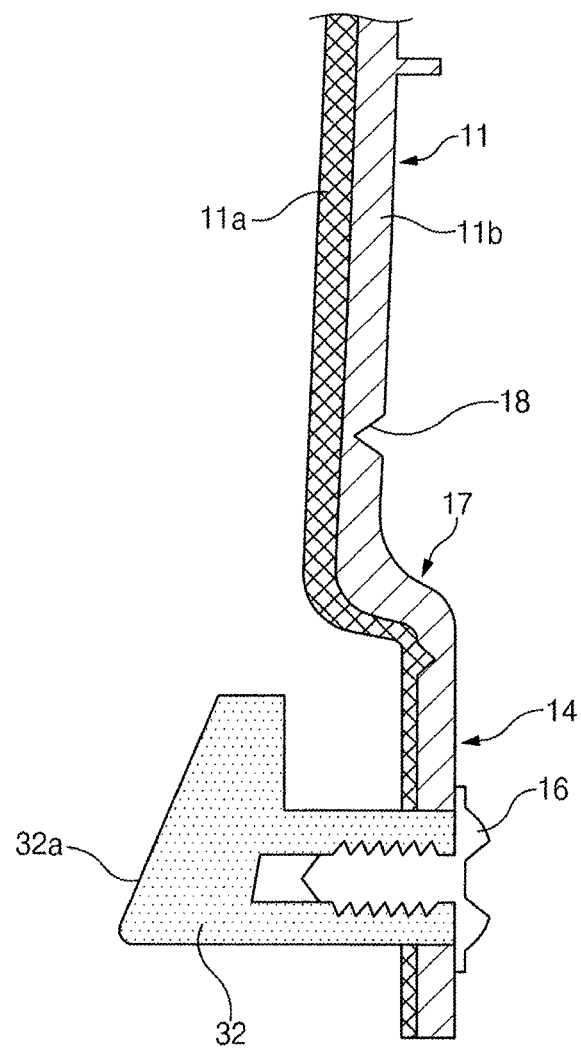
FIG. 3 illustrates an enlarged cross-sectional view of an upper trim panel of FIG. 2.

Referring to FIG. 1, FIG. 2, and FIG. 3, a door armrest assembly 10 for a vehicle may be located inwardly of a vehicle door 12.

The door armrest assembly 10 includes door trim panels 11 and 13 configured for covering an internal side of the vehicle door 12, and a door armrest 20 mounted on the trim panels 11 and 13.

The trim panels 11 and 13 include an upper trim panel 11 located on an internal upper portion of the vehicle door 12, and a lower trim panel 13 located on an internal lower portion of the vehicle door 12.

The upper trim panel 11 includes a base panel 11a, and a buffer sheet 11b attached to the base panel 11a.

The base panel 11a may face an internal region of a vehicle, and the buffer sheet 11b may face a door module 19 or a door panel of the vehicle door 12. The base panel 11a may include a material having a higher rigidity than that of the buffer sheet 11b, and the buffer sheet 11b may include a shock-absorbing material having a relatively lower rigidity, including a foam material, than that of base panel 11a. The base panel 11a may be thinner than the buffer sheet 11b. The upper trim panel 11 may also be called a center trim panel.

The door armrest 20 includes a first end portion 21 supported by a lower end portion of the upper trim panel 11, and a second end portion 22 supported by an upper end portion of the lower trim panel 13.

The first end portion 21 may be connected to the lower end portion of the upper trim panel 11 by snap fitting, fasteners, or the like.

The second end portion 22 may be connected to the upper end portion of the lower trim panel 13 by snap fitting, fasteners, or the like.

For example, as illustrated in FIG. 2 and FIG. 3, a connecting member 15 may be connected to the upper end portion of the lower trim panel 13 by snap fitting, fasteners, or the like. Thus, the second end portion 22 may be connected to the connecting member 15 of the lower trim panel 13 by snap fitting, fasteners, or the like.

The door armrest 20 includes an armrest core 25, a cushion 26 located on an upper surface of the armrest core 25, and a cover 27 which covers an upper portion of the cushion 26.

The armrest core 25 and the cover 27 may include a synthetic resin material configured to provide a rigidity sufficient to support a load applied by the arm of an occupant.

The cushion 26 may include a foam material to damped or absorb the shock of an impact when the occupant's arm is raised on the door armrest 20.

According to exemplary embodiments, at least a portion of the door armrest 20 may be separable from the trim panels 11 and 13 due to impact energy in a side impact.

The door armrest 20 may have a protrusion 31, and the protrusion may protrude downwardly from a portion of the door armrest 20 adjacent to the first end portion 21. The upper trim panel 11 may have a pushing member 32 disposed adjacent to the protrusion 31 of the door armrest 20. Thus, the pushing member 32 may push the protrusion 31 of the door armrest 20 upwardly in the event of a side impact.

Figure 4:
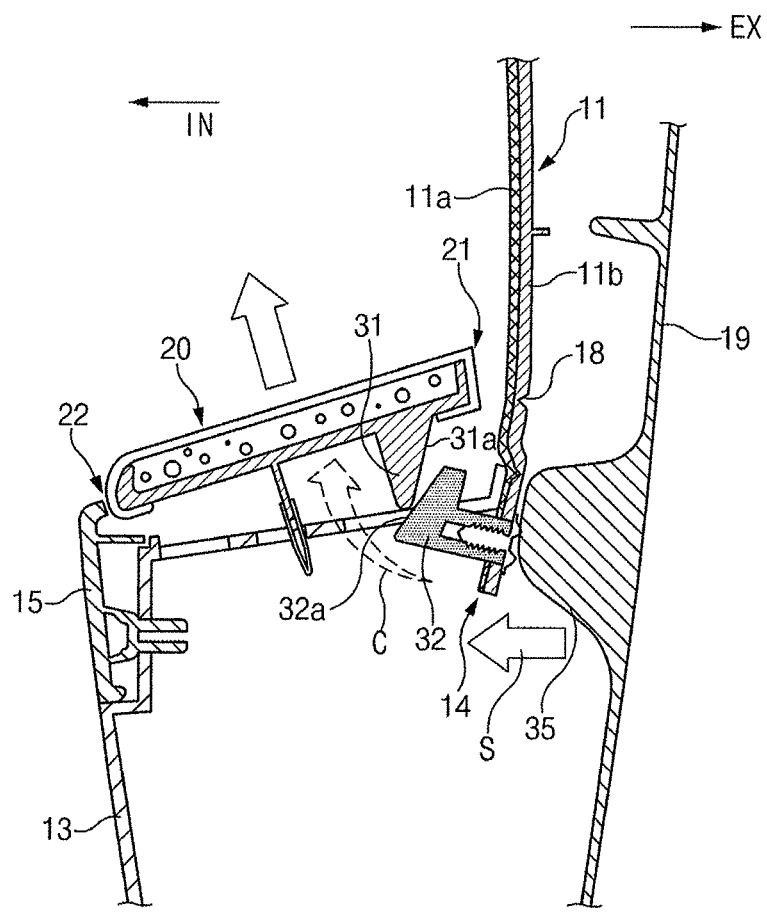
FIG. 4 illustrates a cross-sectional view of a structure in which a door armrest assembly for a vehicle, according to an exemplary embodiment of the present invention, is built into a vehicle door, and a state in which a door armrest is separated from a lower trim panel during a side impact.
Figure 5:
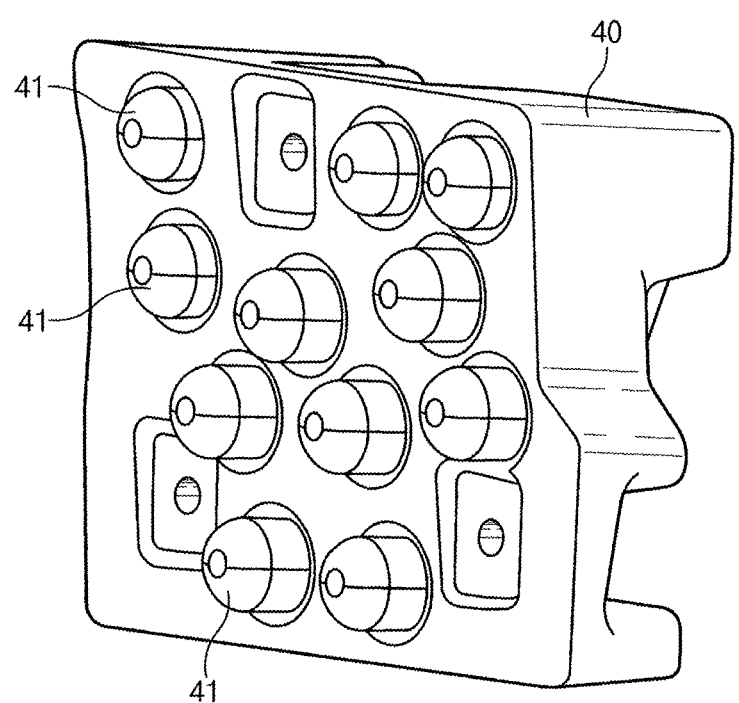
FIG. 5 illustrates a perspective view of a side impact pad in a door armrest assembly for a vehicle, according to an exemplary embodiment of the present invention.]

As illustrated in FIG. 2 and FIG. 4, the protrusion 31 may be integrally formed on a lower surface of the door armrest 20, and the protrusion 31 may protrude downwardly from the lower surface of the door armrest 20. The protrusion 31 may have a first inclined surface 31a which is inclined at a predetermined angle, and the first inclined surface 31a may face the pushing member 32 of the upper trim panel 11.

An extending portion 14 may extend from the lower end portion of the upper trim panel 11 in a vertical direction, and the pushing member 32 may be connected to the extending portion 14 of the upper trim panel 11 by a fastener 16.

The pushing member 32 may have a second inclined surface 32a facing the first inclined surface 31a of the protrusion 31.

For example, the first inclined surface 31a of the protrusion 31 and the second inclined surface 32a of the pushing member 32 may have the same angle of inclination.

Alternatively, the first inclined surface 31a of the protrusion 31 and the second inclined surface 32a of the pushing member 32 may have different angles of inclination.

As illustrated in FIG. 4, in the event of a side impact, when the pushing member 32 is moved in an internal direction of the vehicle (see the direction of arrow in FIG. 2 and FIG. 4) by an impact force (see the direction of arrow S in FIG. 2) transmitted from the vehicle door 12, the pushing member 32 may push the protrusion 31 in the internal direction of the vehicle. As the first inclined surface 31a of the protrusion 31 slides on the second inclined surface 32a of the pushing member 32 to move upwardly, the first end portion 21 of the door armrest 20 may be separable from the upper trim panel 11. When the pushing member 32 is moved further in the internal direction of the vehicle, the second end portion 22 of the door armrest 20 may also be separable from the connecting member 15 of the lower trim panel 13.

According to an exemplary embodiment, the extending portion 14 may be offset in relation to the upper trim panel 11 in an external direction of the vehicle door 12 (see the direction of arrow EX in FIG. 2 and FIG. 4). A step portion 17 may be provided at the lower end portion of the upper trim panel 11 to extend in the external direction of the vehicle (see the direction of arrow EX in FIG. 2 and FIG. 4), and the extending portion 14 may extend from an end portion of the step portion 17 in the vertical direction thereof.

As the extending portion 14 is offset from the lower end portion of the upper trim panel 11 in the external direction of the vehicle door 12 (see the direction of arrow EX in FIG. 2 and FIG. 4), the extending portion 14 may be bent toward the internal of the vehicle when the impact force generated by the side impact is transmitted to the extending portion 14 of the upper trim panel 11. The pushing member 32 may rotate in the direction of arrow C in FIG. 4 by the bending of the extending portion 14. The pushing member 32 may push the protrusion 31 of the door armrest 20 more strongly in the vertical direction (upward direction), and thus the first end portion 21 of the door armrest 20 may be effectively separable from the upper trim panel 11.

According to an exemplary embodiment, the upper trim panel 11 includes a notch 18 formed in a portion of the upper trim panel 11 adjacent to the extending portion 14 and the step portion 17. When the impact force generated by the side impact is transmitted to the extending portion 14, the extending portion 14 may be bent more easily due to the notch 18.

The vehicle door 12 includes a striking portion 35 configured for striking the pushing member 32.

The striking portion 35 may be formed on the door module 19 or the door panel adjacent to the upper trim panel 11. The striking portion 35 may be protruded toward the internal region of the vehicle, and the striking portion 35 may be disposed adjacent to the pushing member 32. When the impact force generated by the side impact is transmitted to the door module 19 or the door panel of the vehicle door 12, the striking portion 35 may strike a back surface of the pushing member 32. Since the pushing member 32 pushes the protrusion 31 of the door armrest 20 with the stronger force in the vertical direction (upward direction), the door armrest 20 may be more easily separable.

As described above, when impact energy generated by the side impact is transmitted to the door armrest 20, at least a portion of the door armrest 20 may be moved upwardly from the door trim panels 11 and 13 by the protrusion 31 of the door armrest 20 and the pushing member 32 of the upper trim panel 11, and the door armrest 20 may be separable from the door trim panels 11 and 13 in the upward direction thereof. The present configuration may prevent the door module or the door panel of the vehicle door 12 from pushing the door armrest 20 and/or the lower trim panel 13 toward an occupant in the event of a side impact, preventing or minimizing injury to the occupant during the side impact.

A side impact pad 40 may be disposed in an internal region adjacent to the lower trim panel 13 of the vehicle door 12, and the side impact pad 40 may include a shock-absorbing material. The side impact pad 40 may have a plurality of protrusions 41 protruding toward the door module 19 or the door panel. The side impact pad 40 may absorb the impact force using the plurality of protrusions 41, preventing a side airbag from being pushed, thus eliminating interference with the operation of the side airbag.

As set forth above, the door armrest assembly for a vehicle, according to exemplary embodiments of the present invention, can provide a rigidity sufficient to support the arm of an occupant under normal conditions, and prevent injury to the occupant as at least a portion of the door armrest is separable from the trim panels in the event of a side impact.

For convenience in explanation and accurate definition in the appended claims, the terms "upper", "lower", "up", "down", "upwards", "downwards", "internal", "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A door armrest assembly for a vehicle, the door armrest assembly comprising:
    a trim panel covering an internal side of a vehicle door and having a pushing member; and
    a door armrest mounted on the trim panel and having a protrusion disposed adjacent to the pushing member,
    wherein at least a portion of the door armrest is separable from the trim panel in a side impact when the pushing member of the trim panel pushes the protrusion,
    wherein the trim panel includes an upper trim panel located on an internal upper portion of the vehicle door,
    wherein an extending portion extends from a lower end portion of the upper trail panel in a vertical direction thereof, and
    wherein the pushing member is directly coupled to the extending portion by a fastener.

2. The door armrest assembly according to claim 1, wherein the trim panel further includes a lower trim panel located on an internal lower portion of the vehicle door.

3. The door armrest assembly according to claim 2, wherein the door armrest includes a first end portion supported by a lower end portion of the upper trim panel, and a second end portion supported by an upper end portion of the lower trim panel, and
    the protrusion is disposed on a portion of the door armrest adjacent to the first end portion.

4. The door armrest assembly according to claim 1, wherein the extending portion is offset with respect to the upper trim panel in an external direction of the vehicle door.

5. The door armrest assembly according to claim 2, wherein the upper trim panel includes a notch.

6. The door armrest assembly according to claim 1, wherein the pushing member has an inclined surface facing the protrusion of the door armrest.

7. The door armrest assembly according to claim 1, wherein the protrusion has an inclined surface facing the pushing member.

8. The door armrest assembly according to claim 1, wherein the door armrest includes an armrest core, a cushion disposed on an upper surface of the armrest core, and a cover covering an upper portion of the cushion.

9. The door armrest assembly according to claim 1, wherein the vehicle door includes a striking portion configured for striking the pushing member.

10. The door armrest assembly according to claim 2, wherein the upper trim panel includes a base panel, and a buffer sheet attached to the base panel.

11. The door armrest assembly according to claim 10, wherein the base panel faces an internal surface of the vehicle.

12. The door armrest assembly according to claim 10, wherein the base panel includes a material having a higher rigidity than a rigidity of the buffer sheet.

13. The door armrest assembly according to claim 10, wherein the buffer sheet includes a shock-absorbing material.

14. The door armrest assembly according to claim 10, wherein the base panel is thinner than the buffer sheet.

* * * * *